May 24, 1966  B. D. MILLER  3,252,619
METHOD AND APPARATUS FOR DISPENSING LIQUID INTO CONTAINERS
Filed June 30, 1964  3 Sheets-Sheet 1
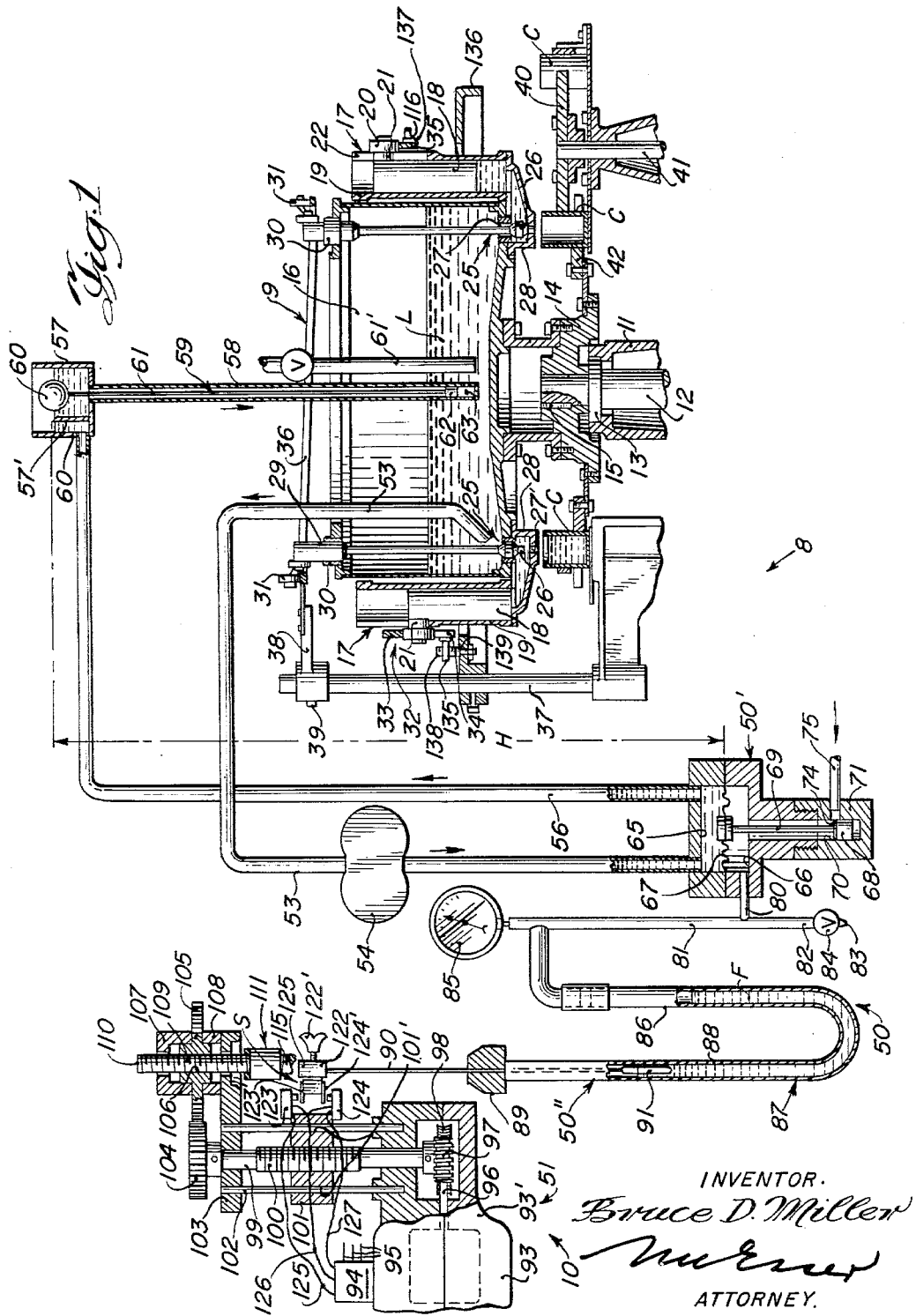

May 24, 1966  B. D. MILLER  3,252,619
METHOD AND APPARATUS FOR DISPENSING LIQUID INTO CONTAINERS
Filed June 30, 1964  3 Sheets-Sheet 2
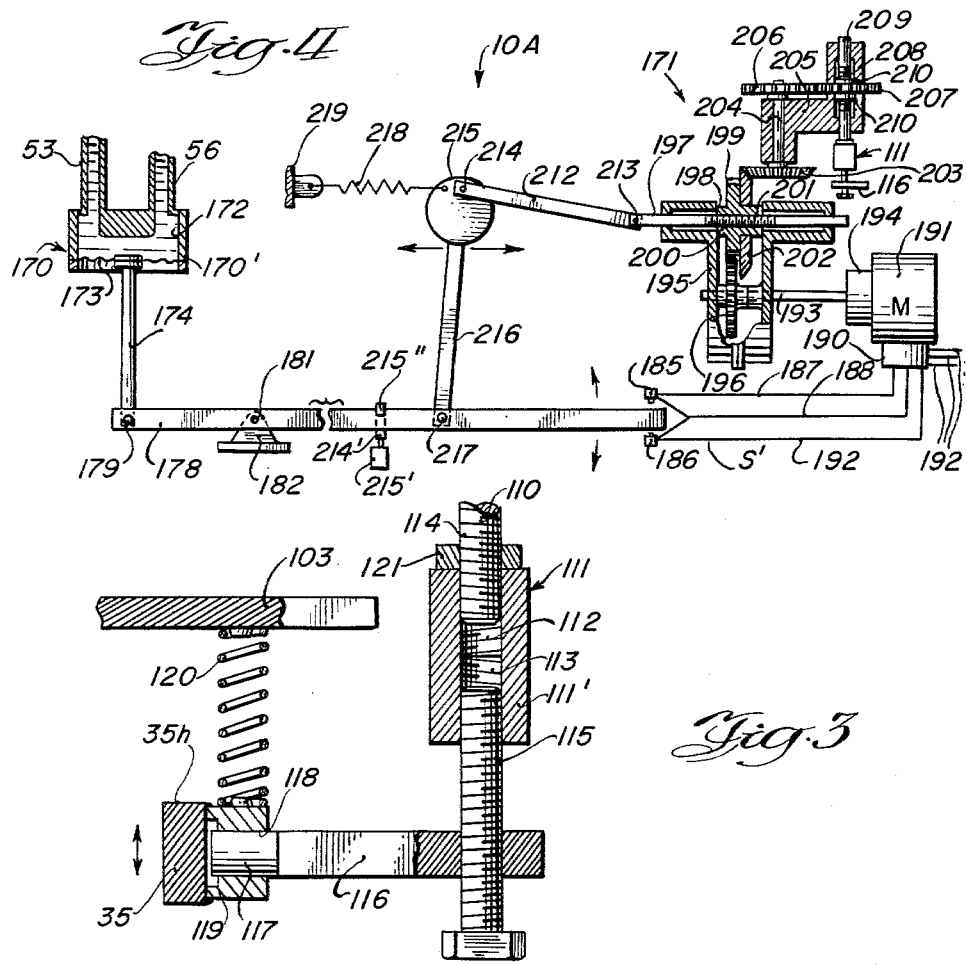
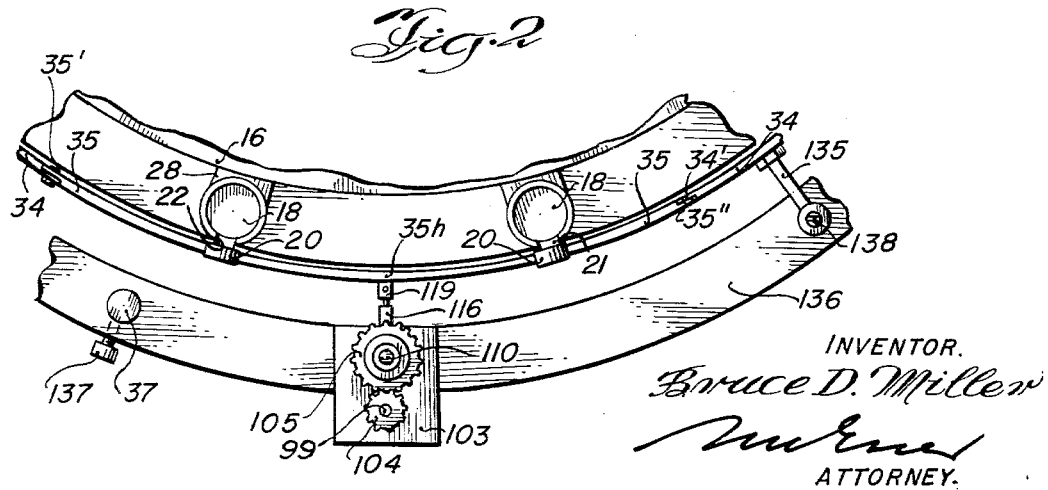
INVENTOR.
Bruce D. Miller
ATTORNEY.

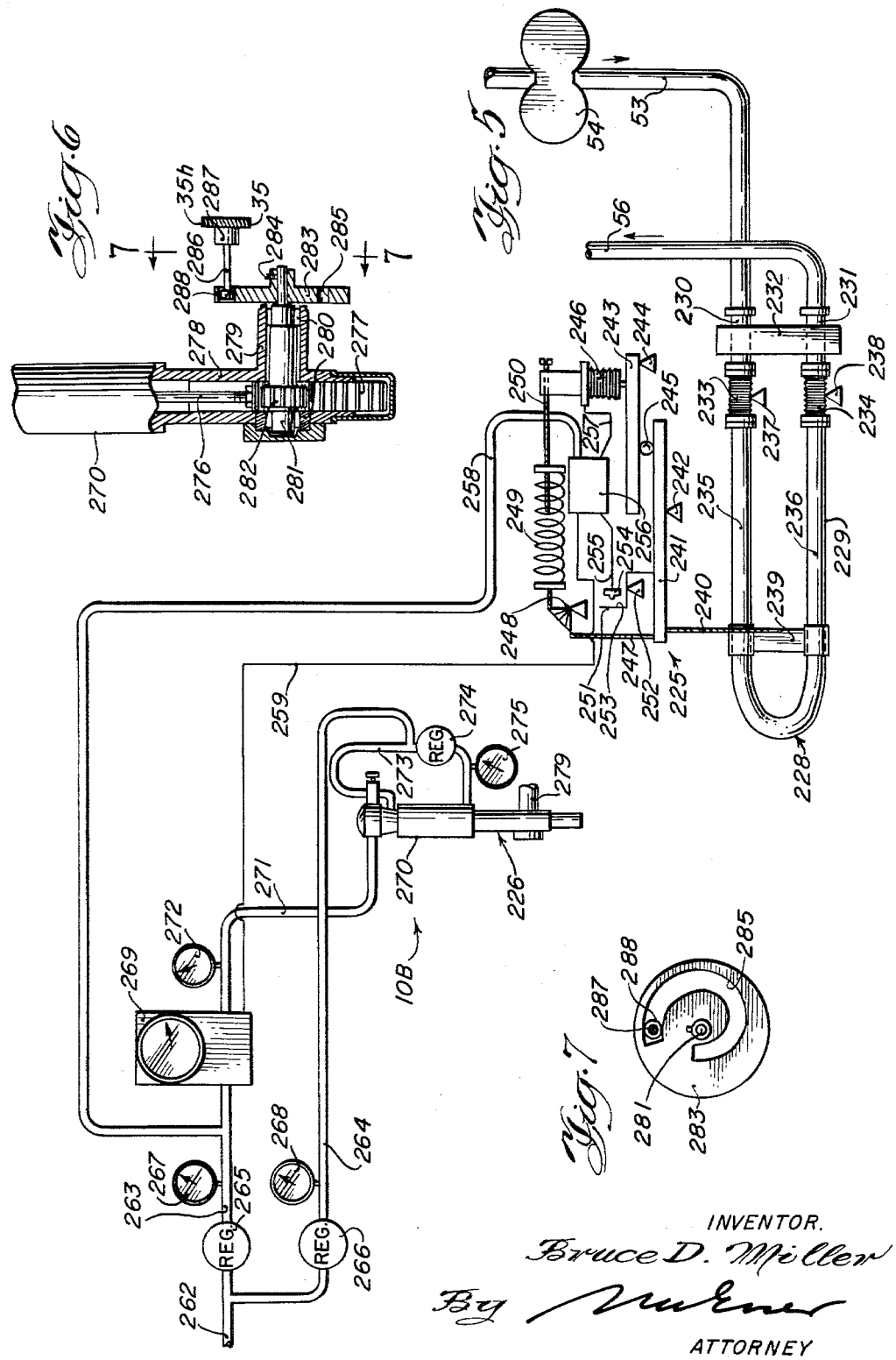

United States Patent Office

3,252,619
Patented May 24, 1966

3,252,619
METHOD AND APPARATUS FOR DISPENSING
LIQUID INTO CONTAINERS
Bruce D. Miller, Winter Park, Fla., assignor to Chemetron
Corporation, Chicago, Ill., a corporation of Delaware
Filed June 30, 1964, Ser. No. 379,157
7 Claims. (Cl. 222—1)

This invention relates to a method and apparatus for dispensing liquid into containers and in particular to a method and apparatus for dispensing a preselected weight of liquid into successive containers. The term "liquid" is intended to include materials having from low viscosities to relatively high viscosities which are capable of being dispensed by a filling machine, for example, orange juice concentrate, shortening, and baby food.

In accordance with the invention, successive containers are capable of being filled with a preselected weight of liquid, thus obviating both overfilling and underfilling of the containers. The method involves adjusting the length of piston travel of a piston in a cylinder of a metering mechanims to establish a preselected weight of liquid to be dispensed, continuously sensing the density of the liquid to be supplied to the metering machanism, and automatically readjusting the length of piston travel in response to each change in the density of the liquid to be metered by the metering mechanism so that a preselected weight of liquid is dispensed into each successive container. Changing the length of piston travel, changes the volume of the liquid which is discharged or displaced by the piston from its cylinder. When the density of the liquid being sensed increases, the length of piston travel is automatically decreased so that a lesser volume of liquid is discharged into the next containers to be filled; the weight of liquid dispensed into the containers, however, remains constant. When the density of the liquid being sensed decreases, the length of piston travel is automatically increased so that a greater volume of liquid is discharged into the next successive containers to be filled; the weight of liquid dispensed into the containers, however, remains constant.

A suitable apparatus for carrying out the above method includes a metering mechanism having a cylinder and a piston for metering liquid into the cylinder during travel on its intake stroke for discharging the liquid during travel on its discharge stroke, a sensing mechanism for sensing changes in the denisty of the liquid which is to be metered by the metering mechanism, and an acutating mechanism responsive to the density sensing mechanism for varying the length of piston travel so that a preselected weight of liquid is dispensed into each successive container. In the drawings:

FIGURE 1 is a schematic view showing one embodiment of apparatus for carrying out the invention, including a control mechanism for a typical filling machine;

FIGURE 2 is a fragmentary top plan view showing a portion of the filling machine and control mechanism;

FIGURE 3 is a fragmentary elevational view, partly in section, showing a portion of the control mechanism;

FIGURE 4 is a schematic view showing another embodiment of the control mechanism;

FIGURE 5 is a schematic view of another embodiment of the control mechanism;

FIGURE 6 is an elevational view, partly in section, showing an actuator of the control mechanism of FIGURE 5; and FIGURE 7 is a sectional view taken along line 7—7 of FIGURE 5.

Referring now to FIGURE 1 of the drawings, there is shown an apparatus generally indicated at 8 for dispensing a preselected weight of liquid into successive containers C. The apparatus 8 is illustrated as including a typical rotary filling machine generally indicated at 9 of a type disclosed in United States Letters Patent No. 2,896,676, FIGURES 1 through 20 and the portion of its specification relating to those figures. Although a rotary filling machine is shown and described, the invention is not to be considered limited to this type of machine, as other and different filling machines including at least one metering mechanism having a piston and cylinder fall within the purview of the invention. The apparatus 8 also includes a control mechanism generally indicated at 10. The machine 9 has a housing 11 in which a shaft 12 is rotatably mounted by a bearing 13. A support 14 is suitably secured to the shaft 12 for example by a key 15. A bowl or reservoir 16, adapted to contain a liquid L, is secured to the support 14. A plurality of metering mechanisms generally indicated at 17 are secured to the reservoir 16. Each metering mechanism 17 includes a piston 18 slidably mounted in a cylinder 19. A roller 20 is rotatably mounted on each piston 18. A guide block 21 slides in an elongated slot 22 of each cylinder 19.

Valve mechanisms generally indicated at 25, are so arranged that there is one valve mechanism 25 for each metering mechanism 17. Each valve mechanism 25 includes a valve 26 for selectively opening and closing inlet and outlet ports 27 and 27'. The outlet ports 27' are formed in valve port housings 28 which are secured to the reservoir 16 and the metering mechanisms 17. The upper end of each valve mechanism 25 has a non-circular portion 29 which is slidable in a matching guide 30 secured to the upper end of the reservoir 16. A roller 31 is rotatably mounted to the non-circular portion 29 above the guide 30.

As the shaft 12 rotates, the support 14, the reservoir 16, the metering mechanisms 17, and the valve mechanisms 52 rotate as a unit; the rollers 20 and their related pistons 18 are thus actuated by an adjustable cam track or cam generally indiacted at 32. The cam 32 is shown to have upper and lower cam track portions 33 and 34. The cam 32 is adjustable to vary the lengths of the strokes of the pistons 18. Although the cam 32 is also shown to be automatically adjustable by means of its adjustable cam section 35, the entire cam track or cam 32 can be constructed to be adjustable to vary the strokes of the piston by a construction not shown, if desired. Various arrangements for manually adjusting the entire cam or only a section of the cam are known in the art. A stationary cam track or cam 36 actuates the rollers 31 to operate their related valve mechanisms 25 upon rotation of the above described components. The cam 36 is connected to support posts 37 by brackets 38. The brackets 38 are adjustable along the support posts 37 by any suitable means, for example set screws 39.

When one of the pistons 18 is in the position shown at the right in FIGURE 1, that piston 18 has completed its intake stroke and, its associated valve 26 being in its lowered position, some of the liquid L has been drawn from the reservoir 16, through the inlet port 27, through the valve port housing 28 and into the cylinder 19. When one of the pistons 18 is in the piston shown at the left in FIGURE 1, that piston 18 has completed its discharge stroke and with its associated valve 26 is is in its raised position, a quantity of liquid equal to that displaced or discharged by the piston 18 from the cylinder 19 has been discharged through the discharge port 27' and into a container C.

The containers C are advanced into filling position relative to the outlet ports 27' by a container advancing means more fully described in the above mentioned patent. Such means include a feed star 40 which can be rotated by a shaft 41 and further includes a chuck 42 secured to the support 14.

The control mechanism 10 includes a sensing and transmitting mechanism generally indicated at 50 and an actuating mechanism generally indicated at 51. The actuating mechanism 51 is responsive to a signal, in particular an air signal, which is proportional to changes in density sensed by a sensing device 50' of the sensing and transmitting mechanism 50. A conduit 53 extends from below the level of the liquid L in the reservoir 16, and preferably in close proximity to the inlet port 27 shown at the left in FIGURE 1, to the sensing device 50'. A pump 54, preferably a gear pump as illustrated, operating to pump liquid at a constant rate through the conduit 53, is disposed in the conduit 53.

The sensing device 50' has a liquid chamber 65 and a chamber 66 for a gas, such as air, separated by a diaphragm 67. A valve 68 having a rod 69 connected to the diaphragm 67, can slide in an enlarged bore 70 in a valve body 71. The valve 68 is capable of both increasing and decreasing its registration with a port 74 in the valve body 71 depending upon the direction of movement of diaphragm 67. A conduit 75, connectable to a suitable source of continuous pressure, such as air pressure, communicates with the port 74. The valve 68 is so arranged relative to the port 74 that when a greater force is exerted on the diaphragm 67 by liquid having a higher density, causing the diaphragm to be moved from an initial level to a lower level, the valve 68 decreases its registration with the port 74 to enable more gas, such as air, to be admitted through the port 74, into the bore 70 and into the chamber 66 so as to restore the diaphragm to its initial level. Because the position of the diaphragm 67 and the level of liquid overflow in the tank 57 remain substantially constant, the head height H of liquid acting on the diaphragm 67 also remains substantially constant.

A transmitting device 50'' of the sensing and transmitting mechanism 50 includes a conduit 80 communicating with the lower end of the chamber 66 and with a conduit 81. The conduit 81 has a lower portion 82 having a discharge end or outlet 83 preferably extending to below the lower end of the chamber 66. The lower portion 82 of the conduit 81 has a vent in the form of a needle valve 84. During operation the valve 84 is open so that air is constantly being bled to the atmosphere. The conduit 81 has a pressure gauge 85. The conduit 81 communicates with one leg 86 of a U-tube generally indicated at 87 containing a suitable fluid F such as oil or mercury. The other leg 88 of the U-tube 87 has a guide 89 by which a rod 90 is guided. A float 91 connected to the rod 90 rises and falls as the level of the fluid F in the leg 88 of the U-tube 87 rises and falls.

The actuating mechanism 51 includes a reversible electric motor 93 having a relay 94. Electrical energy is supplied to the motor 93 through the relay 94 by means of electrical leads 95. The motor 93 has a housing 93' which journals its drive shaft 96. A worm 97 secured to the shaft 96 drives a worm gear 98. The worm gear 98 is connected to a rod or shaft 99 having a screw-threaded portion 100. A relatively large nut or block 101 is threadably received by the screw-threaded portion 100. A pair of guide rods 102 secured to the housing 93' pass through bores 101' in the block 101 to prevent rotation of the block 101 but permit the block 101 to move lengthwise relative to the screw-threaded portion 100 as the shaft 99 is rotated by the worm wheel 98. The pair of rods 102 are secured to a support 103 in which the shaft 99 is journalled. A gear 104 is secured to the shaft 99. The gear 104 meshes with and drives a gear 105 having a threaded central opening 106. The gear 105 is rotatably mounted between bearing blocks 107 and 108. A screw-threaded portion 109 of a rod or shaft 110, threadably received in the threaded opening 106 of the gear 105, is actuated when the gear 105 rotates to thus adjust the cam section 35.

A turnbuckle generally indicated at 111 is provided at the lower end of the rod 110. As best shown in FIGURE 3, the turnbuckle 111 has a turnbuckle body 111' with oppositely threaded bores 112 and 113. The threaded bore 112 threadably receives a screw-threaded end 114 of the rod 110 and the threaded bore 113 threadably receives a screw 115. The screw 115 is threadably received by a connector 116 which has a circular stud 117 at one end. The stud 117 is received in a circular hole 118 in a bracket 119. The bracket 119 is secured to the section 35 of the cam 32. A compression spring 120, acting at one end against the support 103 and at the other end against the bracket 119, serves to eliminate lost motion. A lock nut 121 maintains the turnbuckle 111 in its adjusted position.

A mounting block 122 is adjustably secured to the rod 90 by a thumb screw 122'. Switch means S in the form of proximity switches 123 and 124 are secured to the block 101. Leads 125 and 126 connect the switch 123 to the relay 94, and leads 126 and 127 connect the switch 124 of the relay 94, the lead 126 being common to both the switches 123 and 124. Spaced metal plates 123' and 124' composed of a material to which the switch 123 and 124 respond, operate proximity switches 123 and 124, respectively.

Referring now to FIGURES 2 and 3, a ring 136 is adjustably secured to the posts 37 by suitable screws 137. The cam 32 is adjustably secured to the ring 136 by screws 138. Each screw 138 has a downwardly facing shoulder 139 which abuts against the upper surface of the ring 136.

The adjustable cam section 35 can be pivoted at one end about a pivot 35'. The other end of the adjustable cam section 35 has a finger 35'' in lapped relation with a finger 34' of the cam track portion 34.

During operation, liquid is being supplied to the reservoir 16 through the conduit 61', the pistons 18 are operating on their intake and discharge strokes in timed relationship with the operation of the valve mechanisms 25, the feed star 40 and the chuck 42 so that containers C are continuously being filled. Liquid is continuously being drawn from the reservoir 16 through the conduit 53 by the pump 54, and passes continuously from the conduit 53 into the chamber 65 which may be considered to be a conduit itself and the liquid is returned from the chamber 65 through the conduit 56 to the tank 57. A weir 57' maintains a constant liquid level in a section of the tank 57. Liquid passes over the weir 57' into another section of the tank 57 and through the conduit 58 into the reservoir 16 below the level of the liquid L when a valve assembly 59 is in the position shown in FIGURE 1. The valve assembly includes a float 60 which floats in the liquid in the tank 57 which is downstream of the weir 57'. The valve assembly 59 also includes a stem 61 connected at its upper end to the float 60 and at its lower end to valve 62. The valve 62 is in the form of a tube, which is movable in response to the movement of the float 60, to selectively cover and uncover ports 63. The lower end of the conduit 58, below the ports 63, is closed off so that liquid can pass through the conduit 58 and its ports 63 so long as the valve 62 does not cover the ports 63.

Should the level in the tank 57 descend the float 60 will also descend and when the float 60 has descended sufficiently the valve 62 closes off ports 63 and flow through the conduit 58 and its ports 63 ceases. This obviates free fall of liquid through the conduit 58 with concomitant entrainment of air. The valve assembly 59 insures that the conduit 58 is always filled with liquid during operation.

Assume that the adjustable cam section 35 has been manually adjusted by means of the turnbuckle 111 so that the movement of the pistons 18 of their intake and discharge strokes is sufficient to meter a preselected weight of liquid L from the reservoir 16 into the cylinder 19 so that the containers C can be filled with the preselected weight of liquid. So long as the density of the liquid sensed by the sensing device 50' remains at, or has returned to the preselected value for which the machine 9 has been adjusted, the switches 123 and 124 will be open, the motor 93 will be de-energized, and hence there will be no movement of the adjustable cam section 35. If the density of the liquid acting on the diaphragm 67 increases, the valve 68 will be actuated to cause decreased registration with the port 74, thus permitting more air to pass through the conduit 75 into the bore 70 and the chamber 66 to cause increased pressure in the chamber 66 to return the diaphragm 67 to its initial position. Increased air pressure acting against the diaphragm 67 will also cause greater air pressure in the conduits 80 and 81 and the upper portion of the leg 86 and U-tube 87. Air passing into the conduit 81 passes through the needle valve 84 and is discharged through the outlet 83. The increased air pressure against the fluid F in the U-tube 87 will cause the liquid F to be shifted to a lower liquid level in the leg 86 and to a correspondingly higher liquid level in the leg 88, thus causing the float 91, and hence the rod 90 to which it is connected, to rise. Assuming that the rod 90 has risen a sufficient distance so that the switch 123 is actuated to energize the motor 93, the shaft 96 rotates in one preselected direction. The shaft 96 thus causes the worm 97 to rotate the shaft 99 by rotating worm gear 98. The screw-threaded portion 100 of the shaft 99 will advance the block 101 until the switch 123 is deactuated to de-energize the motor 93 and thus terminate rotation of its drive shaft 96. So long as the shaft 99 is rotating, the gear 104 turns the gear 105. Rotation of the gear 105 causes the rod 110 to advance in a downward direction. As the rod 110 advances downwardly, the screw 115, which is connected to turnbuckle body 111' moves the connector 116 downwardly, thus pivoting the adjustable cam section 35 about pivot pin 35' so that the high point 35h of the cam section 35 is at a lower elevation. Succeeding rollers 20 which thereafter roll over the high point 35h of the cam section 35 will be raised to a lesser elevation, thus decreasing the lengths of the intake and discharge strokes of their associated pistons 18.

Assuming that the density of liquid acting upon the diaphragm 67 decreases, the liquid level in the leg 86 will rise and the liquid level in the leg 88 will fall because of consequent increased registration of the valve 68 with the port 74; less air pressure exists not only in the chamber 66 but also in the conduits 80 and 81 and the upper portion of the leg 86. The float 91 thus assumes a lower elevation and as the switch 124 is actuated to energize the motor 93, the motor 93 will rotate the drive shaft 96 in a direction opposite to that in which it is rotated when the switch 123 was actuated. The drive shaft 96 rotates the worm 97 which in turn rotates the rod 99 through the worm 98. The screw-threaded portion 100 advances the block 101 until the switch is deactuated to de-energize the motor 93. Rotation of the shaft 99 rotates the gear 104 which in turn rotates the gear 105 to advance the rod 110 upwardly. As the rod 110 advances upwardly, the screw 115, which is connected to the turnbuckle body 111', moves the connector 116 upwardly, thus pivoting the adjustable cam section 35 about pivot pin 35' so that the high point 35h of the cam section 35 is at a higher elevation. Since the rollers 20 now are raised to a higher elevation as they roll over the high point 35h, the lengths of the intake and discharge strokes of their associated pistons 18 are also increased.

In the embodiment shown schematically in FIGURE 4 of the drawings, the conduits 53 and 56 communicate with an alternative form of control mechanism generally indicated at 10A including a sensing and transmitting mechanism generally indicated at 170 and an actuating mechanism generally indicated at 171.

The sensing and transmitting mechanism 170 includes a sensing device 170' having a liquid chamber 172 formed in part by a diaphragm 173. A rod 174 is connected to the diaphragm 173 at one end and is pivotally connected to a lever 178 at its other end by a pivot pin 179. The lever 178 has a fulcrum defined by a pivot pin 181 which passes through the lever 178 and a stationary mounting bracket 182. The other end of the lever 178 straddles proximity switches 185 and 186. Leads 187 and 188 connect the switch 185 to a relay 190 for a motor 191, and leads 188 and 192 connect the switch 186 to the relay 190, the lead 188 being common to both the switches 185 and 186. The leads 192 supply electrical energy to the motor 191 through the relay 190. The motor 191 drives a drive shaft 193 through a speed reducer 194. The drive shaft 193 is rotatably journalled in a stationary frame 195. A gear 196 within the frame 195 is securely mounted to the drive shaft 193. A rod 197 is guided for movement in the frame 195. The rod 197 has a screw-threaded portion 198. A gear 199, which meshes with the gear 196, has a hub 200 with a threaded central bore 201. The threaded bore 201 threadably receives the threaded portion 198. The hub 200 is straddled in the frame 195 to prevent any shifting of the gear 199 along its axis, but to permit rotation of the gear 199. A bevel gear 202 is secured to the gear 199 so that both rotate together, as a unit. The bevel gear 202 meshes with and drives a bevel gear 203. The bevel gear 203 is secured to a shaft 204 journalled in a stationary frame 205. A gear 206 is also secured to the shaft 204. The gear 206 drives a gear 207 which is threadably received by a screw-threaded portion 208 of a rod 209. The rod 209 is guided for movement in the frame 205. The gear 207 is prevented from shifting along its axis because its hub 210 is straddled in the frame 205; however, the gear 207 is capable of rotating in the frame 205. Rotation of the gear 207 in one direction advances the rod 209 in one direction and rotation of the gear 207 in the opposite direction advances the rod 209 in the opposite direction; thus, depending upon the direction of rotation of the gear 209 the high point 35h of the cam section 35 is either raised or lowered. The position of the high point 35h of the adjustable cam section 35 determines the length of piston travel of the pistons 18 on their intake and discharge strokes. The rod 197 is pivotally connected to one end of a link 212 by a pivot pin 213. The other end of the link 212 is connected by a pivot pin 214 to a weight 215. A link 216 is pivotally connected at one end to the lever 178 by a pivot pin 217 and is secured to the weight 215 at its other end. A tension spring 218 is shown to connect the weight 215 and a stationary bracket 219. The spring 218 obviates any lost motion in the linkage from the gear 199 to the weight 215, as the weight 215 moves.

To calibrate the control mechanism 10A for the particular liquid to be dispensed, a weight 215', connected to a hook 215" by a pivot pin 214', is hooked to the lever 178 at almost any place along its length.

In operation, liquid is passed through the conduit 53, the chamber 172, and the conduit 56 in the same manner as shown in FIGURE 1 and as described above. Should the density of the liquid in the conduits 53 and 56 and in the chamber 172 increase, the diaphragm 173 and the rod 174 will be moved downwardly from their initial positions and the lever 178 will be pivoted in a counterclockwise direction as viewed in FIGURE 4.

Assuming that the lever 178 has moved sufficiently so that the switch 185 is actuated to energize the motor 191, the motor 191 will rotate the drive shaft 193 in one direction. The drive shaft 193 drives the gear 196 which in turn drives the gear 199. As the gear 199 rotates, the rod 197 is advanced so that the link 216 is pivoted in the clockwise direction as viewed in FIGURE 4. The link 216 continues to pivot in the clockwise direction until the weight 215 has shifted sufficiently to return the lever 178 and hence the diaphragm 173 to their initial positions. When the lever 178 is close to its initial position the switch 185 is deactuated and the motor 191 is deenergized. So long as the motor 191 is still energized and the drive shaft 193 operates in the above described direction, the bevel gear 202 drives the bevel gear 203, the gear 206 drives the gear 207, and the gear 207 operates the rod 209. Because the density of the liquid is too great, the rod 209 is moved downwardly so that the high point 35h of the adjustable cam section 35 is lowered to decrease the lengths of the intake and discharge strokes of the pistons 18.

The operation of the embodiment of FIGURE 4 when the density of the liquid sensed by the sensing device 170' is reduced will be apparent to one skilled in the art.

To use the apparatus of either the embodiment of FIGURES 1 through 3, or the embodiment of FIGURE 4, the cam section 35 is first manually adjusted by the operator by any suitable means such as by manually adjusting the turnbuckle 111. The machine 9 is thus calibrated to dispense a preselected weight of the liquid L in the reservoir 16. The density or weight per unit volume of the liquid L to be supplied to the metering mechanisms 17 can vary for a variety of reasons, because the density of the liquid supplied to the reservoir varies, because the temperature of the liquid L varies, and/or because the amount of entrained gas for example air in the liquid L varies. Liquid L from the reservoir 16 is continuously passed to the sensing device 50', for example, by which the density is continuously and automatically sensed. The cam segment 35 is automatically adjusted for each change in the density so that the preselected weight of liquid is dispensed into each successive container.

Referring now to the embodiment of FIGURES 5 through 7, there is shown a control mechanism generally indicated at 10B which includes a sensing and transmitting mechanism generally indicated at 225 and an actuating mechanism generally indicated at 226. Conduits 53 and 56 are arranged in the same manner as shown in FIGURE 1 of the drawings. The sensing and transmitting mechanism 225 includes a sensing device 228 having a U-tube 229 which is shown in perspective for the sake of clarity. The conduits 53 and 56 are connected to the U-tube 229 by connectors 230 and 231 which are rigidly positioned by means of a common anchor 232. Flexible tube sections 233 and 234 are connected to the connectors 230 and 231, respectively. The flexible tube sections 233 and 234 are in turn connected to legs 235 and 236, respectively, of the U-tube 229. The U-tube 229 is preferably disposed in a substantially horizontal position. U-tube fulcrums 237 and 238 enable the U-tube 229 to be deflected in proportion to changes in the density of the liquid passing through U-tube 229. A load arm 239 connects the legs 235 and 236 at a substantial distance from their fulcrums 237 and 238. A supporting cable 240 is connected at its upper end to a primary beam 241 and at its lower end to the load arm 239. A primary beam pivot 242 is employed to pivotally mount the primary beam intermediate its ends. A secondary beam 243 is mounted at one end about a secondary beam pivot 244 and is mounted intermediate its ends by a span adjustment roller 245. The span adjustment roller 245 bears against the primary beam 241 near the end opposite to the end to which the supporting cable 240 is connected.

A balancing bellows 246 exerts a force on the secondary beam 243 intermediate of and opposite to the direction in which forces are exerted by the pivot 244 and the span adjustment 245. A suppression strap 247 is connected at one end to a suppression pivot 248 and at its other end to the primary beam 241. A suppression spring 249 is connected at one end to a suppression pivot 248 and at its other end to a zero screw 250. A flapper 251, connected to the primary beam 241, is pivotal about a flapper pivot 252. The flapper 251 has a face 253 which is movable toward and away from a nozzle 254. The nozzle 254 is connected by a conduit 255 to a pilot relay 256. A conduit 257 connects the balancing bellows to the pilot relay 256. Air under pressure is supplied to the pilot relay 256 through a conduit 258, and a low pressure air signal is passed from the pilot relay 256 into and through a conduit 259.

Air pressure is supplied through a conduit 262 to conduits 263 and 264. Conduits 263 and 264 have pressure regulators 265 and 266 and pressure gauges 267 and 268, respectively. Conduit 263 is connected to the conduit 258 and a recorder-controller 269. The recorder-controller 269 receives a low pressure air signal through conduit 259 and amplifies that signal and passes a higher but proportional air signal to an actuator 270 of the actuating mechanism 226 through a conduit 271. The conduit 271 has a pressure gauge 272. A conduit 273 communicates with the conduit 264. The conduit 273 is connected at its ends to the actuator 270. The conduit 273 contains a loading pressure regulator 274 and a pressure gauge 275. The actuator 270 has a stem 276 to which a rack 277 is connected. The stem 276 and the rack 277 move in a housing 278. The housing 278 has a hub 279. Spaced apart bearings 280 are mounted in the housing 278. A shaft 281 is mounted for rotation in the bearings 280. A pinion 282, which meshes with the rack 277, is secured to the shaft 281. A cam 283 is adjustably secured to the shaft 281 by a set screw 284 or by any other suitable means. The cam 283 has an internal cam groove 285. A shaft 286 is rigidly secured to the cam section 35 at one end by a bracket 287. The other end of the shaft 286 rotatably mounts a roller 288 received in the cam groove 285. Movement of the stem 276 will cause movement of the rack 277 and rotation of the pinion 282 and the shaft 281. Rotation of the shaft 281 will cause rotation of the cam 283. Rotation of the cam 283 will cause the roller 288 to travel in the cam groove 285 with consequent movement of the cam section 35. The high point 35h of the cam section 35 will be lowered in the event the sensing device 228 senses an increase in density, and the high point 35h of the cam 35 will be raised in the event the sensing device 228 senses a decrease in density.

In the operation of the embodiment shown in FIGURES 5 through 7 of the drawings, let it be assumed that the filling machine 9 to which the control mechanism 10B is connected is dispensing the correct weight of liquid into each of the containers C because of proper adjustment of the zero screw 250 or the set screw 284, for example. Should the density of the liquid passing from the conduit 53 into the U-tube 229 increase, the tension on the supporting cable 240 also increases. The primary beam 241 is pivoted in the counterclockwise direction as viewed in FIGURE 5 and the face 253 of the flapper 251 moves toward the nozzle 254, thus increasing the resistance to air flow through the nozzle 254. A lower low pressure air signal passing through the conduit 259 from the pilot relay 256 to the recorder-controller 269 is amplified and a lower high pressure signal is passed through the conduit 271 from the recorder-controller 269 to the actuator 270. The stem 276 of the actuator 270 is thus moved upwardly and the pinion 282 rotates the shaft 281 which in turn rotates the cam 283. The cam 283 lowers the shaft 286 which in turn lowers the high point 35h of the cam section 35.

When the density of the liquid passing through the U-tube 229 decrease, a higher low pressure air signal is passed to the recorder-controller 269 through the conduit 259, and a higher high pressure air signal is passed to the actuator 270 from the recorder-controller 269. The actuator 270 serves to actuate the rack 277, the pinion 282, the shaft 281, and the cam 285 to raise the high point 35h of the cam section 35.

Other embodiments and modifications of this invention will suggest themselves to those skilled in the art, and all such of these as come within the spirit of this invention are included within its scope as best defined by the appended claims.

I claim:

1. An apparatus for dispensing a preselected weight of liquid into successive containers, comprising: a plurality of pairs of metering and valve mechanisms, a reservoir for liquid communication with said valve mechanisms, each metering mechanism including a cylinder and a piston for metering liquid into said cylinder during travel on its intake stroke and for discharging the liquid from said cylinder during travel on its discharge stroke, means for actuating said pistons including an adjustable cam for varying the length of travel of said pistons, means for actuating said valve mechanisms to enable liquid to be drawn into said cylinders from said reservoir during the intake strokes of said pistons and to enable the liquid to be dispensed during the discharge strokes of said pistons, means for continuously weighing a unit volume of the liquid to be supplied to said metering mechanisms, and means responsive to said weighing means for adjusting said cam so that a preselected weight of liquid is dispensed into each successive container.

2. An apparatus for dispensing a preselected weight of liquid into successive containers, comprising: a plurality of pairs of metering and valve mechanisms, a reservoir for liquid communication with said valve mechanisms, each of pairs of metering and valve mechanisms, a reservoir for metering liquid into said cylinder during travel on its intake stroke and for discharging the liquid from said cylinder during travel on its discharge stroke, an adjustable cam for actuating said pistons, means for manually adjusting said cam to adjust the length of travel of each piston so that a preselected weight of liquid can be discharged by said pistons, means for actuating said valve mechanisms to enable liquid to be drawn into said cylinders from said reservoir during the intake strokes of said pistons and to enable liquid to be dispensed during the discharge strokes of said pistons, means for continuously sensing changes in the density of the liquid being supplied to said metering mechanisms, conduit means through which liquid can be drawn from said reservoir and returned to said reservoir, said sensing means forming a part of said conduit means, said conduit means being arranged so that the head of liquid acting against said sensing means remains constant, and means responsive to said density sensing means for adjusting said cam so that a preselected weight of liquid is dispensed into each successive container.

3. An apparatus for dispensing a preselected weight of liquid into successive containers, comprising: at least one metering mechanism including a cylinder and a piston for metering liquid into siad cylinder during travel on its intake stroke and for discharging the liquid from said cylinder during travel on its discharge stroke, means for weighing a unit volume of the liquid being supplied to said metering mechanism, and means responsive to said weighing means for varying the length of piston travel so that a preselected weight of liquid is dispensed into each successive container.

4. An apparatus for dispensing a preselected weight of liquid into successive containers, comprising: a plurality of pairs of metering and valve mechanisms, a rotatable reservoir for liquid communication with said valve mechanisms, each metering mechanism including a cylinder and a piston for metering liquid into said cylinder during travel on its intake stroke and for discharging the liquid from said cylinder during travel on its discharge stroke, means for actuating said pistons including an adjustable cam for varying the length of travel of said pistons, means for actuating said valve mechanisms to enable liquid to be drawn into said cylinders from said reservoir during the intake strokes of said pistons and to enable the liquid to be dispensed during the discharge strokes of said pistons, means for continuously sensing changes in the density of the liquid to be supplied to said metering mechanisms, a reversible motor having a drive shaft, switch means electrically connected to said reversible motor, means responsive to changes in the density of the liquid sensed by said sensing means for actuating said switch means to selectively rotate said drive shaft in one direction and in the opposite direction, and means connected to said drive shaft for adjusting said cam so that the strokes of said pistons can be varied to cause a preselected weight of liquid to be dispensed into each successive container.

5. An apparatus for dispensing a preselected weight of liquid into successive containers, comprising: a plurality of pairs of metering and valve mechanisms, a reservoir for liquid communicaton with said valve mechanisms, each metering mechanism including a cylinder and a piston for metering liquid into said cylinder during travel on its intake stroke and for discharging the liquid from said cylinder during travel on its discharge stroke, means for actuating said pistons including an adjustable cam for varying the length of travel of said pistons, means for actuating said valve mechanisms to enable liquid to be drawn into said cylinders from said reservoir during the intake strokes of said pistons and to enable the liquid to be dispensed during the discharge strokes of said pistons, means for continuously sensing changes in the density of the liquid to be supplied to said metering mechanisms, said sensing means being constructed and arranged to transmit a signal which is proportional to changes in the density of the liquid being sensed, means responsive to changes in a signal received from said sensing means for varying a fluid level, a float responsive to changes in the fluid level, a reversible motor having a drive shaft, means for energizing said reversible motor to selectively rotate said drive shaft in one direction and in the opposite direction depending upon the position of said float and including switch means actuated by said float, and means connected to said drive shaft for adjusting said cam so that the strokes of said pistons can be varied to cause a preselected weight of liquid to be dispensed into each successive container.

6. An apparatus for dispensing a preselected weight of liquid into successive containers, comprising: at least one metering mechanism including a cylinder and a piston for metering liquid into said cylinder during its intake stroke and for discharging the liquid from said cylinder during its discharge stroke, means for sensing changes in the density of the liquid being supplied to said metering mechanism including a U-tube constructed and arranged to deflect in response to changes in the density of the liquid passing through it, a controller for transmitting a signal, means responsive to the deflection of said U-tube for transmitting to said controller a signal which is proportional to the deflection of said U-tube, and an actuating mechanism responsive to a signal from said controller for varying the length of piston travel so that a preselected weight of liquid is dispensed into each successive container.

7. Method of successively dispensing a preselected weight of liquid into successive containers in a machine including at least one metering mechanism having a piston for drawing liquid into the cylinder on its intake stroke and for discharging the liquid on its discharge stroke, comprising the steps of: adjusting the length of piston travel to establish a preselected weight of liquid to be dispensed, continuously weighing a unit volume of the liquid to be supplied to the metering mechanism, and automatically readjusting the length of piston travel in response to each change in the weight per unit volume of the liquid to be supplied to the metering mechanism so that a preselected weight of liquid is dispensed into each successive container.

References Cited by the Examiner

UNITED STATES PATENTS

| | | | |
|---|---|---|---|
| 2,794,451 | 6/1957 | Schmidt | 141—1 |
| 2,961,013 | 11/1960 | Johnson. | |
| 3,151,775 | 10/1964 | Whitehead | 222—57 |

LOUIS J. DEMBO, *Primary Examiner.*

HADD S. LANE, *Examiner.*